Jan. 5, 1954    J. H. WEAVING ET AL    2,664,980
CLUTCH AND GEAR CHANGE OPERATING SYSTEM FOR AUTOMOBILES
Filed Feb. 14, 1951
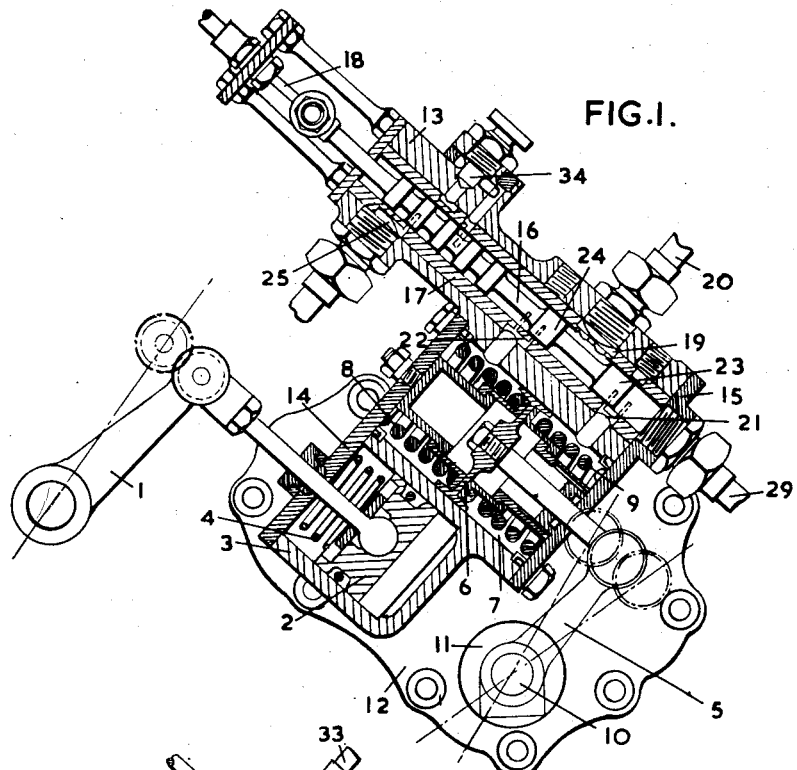
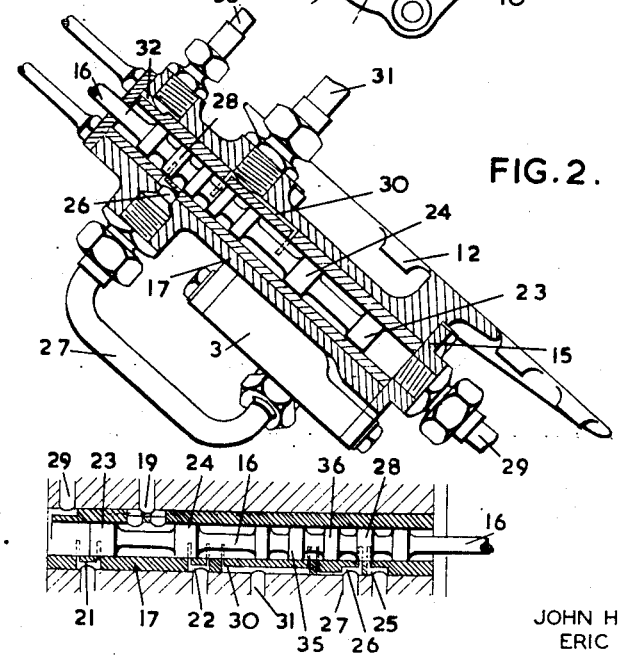
INVENTORS
JOHN HAROLD WEAVING
ERIC RICHARD PAYNE
BY *A. Yates Dowell*
ATTORNEY Patented Jan. 5, 1954

2,664,980

UNITED STATES PATENT OFFICE 2,664,980

CLUTCH AND GEAR CHANGE OPERATING SYSTEM FOR AUTOMOBILES

John H. Weaving, Moseley, Birmingham, and Eric R. Payne, Kings Heath, Birmingham, England, assignors to The Austin Motor Company, Limited, Birmingham, England Application February 14, 1951, Serial No. 210,858

5 Claims. (Cl. 192—3.5)

This invention relates to clutch and gear change operating systems for automobiles.

In an automobile, gear changing normally involves disengaging the clutch, selecting and engaging the gear to be brought into operation, and then re-engaging the clutch. Usually the clutch is disengaged and re-engaged by a foot pedal through a mechanical linkage, and gear selection and engagement are effected by a separate control, usually a hand lever, which operates either directly or through mechanical linkage the appropriate selector rod in the change-speed gear box. The movements of the gear change hand lever for effecting actual gear selection and engagement of the gears are usually controlled by a gate and are in planes parallel to one another and in a plane at right angles to said parallel planes and corresponding to a neutral position. Movement through neutral from one parallel plane to the other transfers the gear lever from one selector rod to another, as may be required, and movement from neutral and in the appropriate direction in the parallel plane to which the lever has been brought slides the corresponding selector rod to engage the selected gear.

In an automobile clutch and gear change operating system according to the present invention, clutch disengagement, gear selection and engagement, and clutch re-engagement are all effected by one driver-operated control, preferably a manual control. Conveniently this control member may be the now common change speed gear lever mounted on the steering column and which has up and down movement, in a neutral plane, radial to the column, for engaging the appropriate selector rod, and turning movement about the axis of the column, and in different parallel planes, to engage whichever gear has been selected.

According to a further feature of the invention the clutch operations and the gear shift operations are effected from the common control member and in correct sequence by fluid pressure cylinders which are under the control of a hydraulic valve which is operated by the driver.

The fluid pressure cylinders may be supplied, under the control of the hydraulic valve, with oil at suitable pressure either by using a pressure reducing valve on the usual engine driven oil supply pump, with the pump relief valve adjusted to give the required pressure, or some other method such as by a separate engine driven pump. The clutch operating cylinder may be single acting and have a spring-loaded piston connected to the clutch withdrawal lever. The gear shift cylinder would be double-acting with its piston loaded by springs on opposite sides and connected to a lever which actuates the gear shift mechanism of the gear box.

The invention will now be more fully described with reference to the accompanying drawings, in which:

Fig. 1 is a sectional elevation of the means for effecting the clutch operations and the gear shift operations, the section being taken in a common axial plane of the hydraulic valve and of the fluid pressure cylinders which operate the clutch and gear shift mechanism respectively.

Fig. 2 is a section taken in an axial plane of the hydraulic valve and at right angles to the plane of the section in Fig. 1.

Fig. 3 is a schematic diagram of the hydraulic valve with all the ports shown in the plane of the section so as to facilitate the understanding of the operation or sequence of operations performed by the valve.

Referring to the drawings, the clutch withdrawal lever 1 is operated by the piston 2 of a single acting fluid pressure cylinder 3, which piston is loaded by a helical spring 4. The gear shift lever 5 is connected to the piston 6 of a double acting fluid pressure cylinder 7, said piston 6 being loaded by springs 8, 9 on opposite sides. The gear shift lever 5 operates a shaft 10 which passes through a bearing boss 11 in the cover 12 of the gear box which end cover is cast integrally with said cylinders 3 and 7 and also with the casing 13 of the hydraulic valve which controls said cylinders. The upper ends of the two cylinders 3, 7 are fitted with a common end plate 14 and the lower ends of the cylinder 7 and valve casing 13 are closed by a common end plate 15.

The hydraulic valve comprises a plunger 16 which works within a liner 17 in the casing 13 and has a number of lands which control the various ports in said liner, said lands being separated by reduced portions which, together with the liner, define annular chambers for connecting various ports in correct sequence according to the axial adjustment of the plunger 16 by the common control member (not shown) which may be the now usual hand operated gear change lever previously referred to. Movement of this common control member in the neutral plane for engaging the required selector rod involves only a very light load and therefore may be transmitted by a cable of the "Bowden" type to the selector gate to line up with the required selector rod. After the appropriate selector rod has been engaged, movement of the common control member or gear lever in a plane at right angles to the neutral plane, to engage the selected gear, is transmitted directly to the plunger 16 of the hydraulic valve, say by means of rods or a cable 18, to move said plunger axially in the appropriate direction from its neutral position shown in the drawings.

In the neutral position, see particularly in Fig. 3, a pressure supply port 19 connected by pipe lines 20 to the pump is cut off or isolated from ports 21, 22, leading to opposite ends of the gear shift cylinder 7, by the lands 23, 24 respectively of the plunger 16, whilst a further pressure supply port 25 connected to the pump is closed or isolated from one end of a port 26 leading, by a pipe 27, to the clutch cylinder 3 by the plunger land 28. The gear shift port 21 is, however, connected, through the bottom end space of the liner 17 and the conduit 29, to the engine sump and the other gear shift port 22 is also connected to the engine sump through the annular space immediately above the land 24 and one end of an axial portway 30 which is connected by a conduit 31 to said sump. Also one end of the clutch port 26 is connected through an annular space, between the third and fourth lands from the top of the plunger 16, and the opposite end of the portway 30 to the conduit 31 leading to the said sump. The upper end space in the liner 17 is connected through a port 32 and pipe 33 to the sump or to the suction side of the pump (see Fig. 2).

The relationship of the various ports and the co-operating lands of the plunger 16 is such that during the first part of the axial movement of said plunger from the neutral position in either direction, the working chamber of the clutch cylinder 3 is placed in communication with the pressure oil supply so that the piston 2 is displaced, against the action of its spring 4, and moves the lever 1, to the chain line position indicated, so as to disengage the clutch. If this axial movement is downward (equivalent to movement to the left in Fig. 3), the pressure supply port 25 is placed in communication with the adjacent end of the port 26 through the annular space between the top land and the land 28, and other end of the latter port is closed by the next land below the land 28. If, on the other hand, such movement is upward (i. e. to the right in Fig. 3), the annular space between the land 28 and the land below it will connect the port 25 to the upper end of the port 26, and the fourth land from the top will close the lower end of the port 26. During this initial part of the axial movement, in either direction, the gear shift ports 21, 22 remain connected to the engine sump.

Continued movement in the same direction, i. e. either downwards or upwards, causes the valve to open or uncover one of the gear shift ports 21, 22 and connect it to the pressure supply port 19 whilst keeping the pressure supply port 25 connected to the clutch port 26 and so maintaining the clutch disengaged. This opening of the gear shift port 21 or 22 to the pressure supply port 19 places the appropriate working space of the gear shift cylinder 7 in communication with the pressure oil supply and thereby displaces the piston 6 to engage the selected gear. The port 21 or 22 which is not connected to port 19 remains connected to the engine sump to maintain the selected gear engaged, and still further movement of the valve in the same direction will cause pressure supply port 25 to be closed to the port 26, and port 26 to be opened to port 31, and thereby allow the pressure oil in the working chamber of the clutch cylinder 3 to be displaced to the sump (or to the suction side of the pump) under the action of the spring-loaded piston 2 and so re-engaging the clutch.

On disengaging a gear the operation above described will take place in the reverse order.

In order to control the engagement of the clutch an adjustable restriction valve 34 may be provided in the outlet from the clutch operating cylinder to the engine sump.

It is realized that the use of hydraulic servo systems for the purpose of controlling mechanisms is a well known art and that such servo mechanisms have been used for gear shifting, but it is a characteristic of this invention that, with the exception of minor parts, the whole hydraulic control mechanism is contained in one casting which is interchangeable with the cover of a standard gear box. This has the great advantage of convertibility and a saving in expense by using parts that are in large quantity production.

Having fully described our invention, what we claim and desire to secure by Letters Patent is:

1. A cover for attachment to a transmission housing, a clutch operating cylinder and piston on said cover, a gear shifting cylinder and ram on said cover and a valve cylinder on said cover, a valve plunger mounted in said valve cylinder, means on said valve cylinder for connection to a source of fluid pressure, means providing fluid passages from said valve cylinder to said clutch and gear shifting cylinders, said valve plunger and passages being so arranged that movement of said plunger will actuate said clutch piston and said gear shifting ram in sequence for shifting gears upon movement of said plunger.

2. A control for a transmission comprising a cover, a clutch actuating cylinder and piston mounted on said cover for operative connection to a clutch, a gear shifting cylinder and ram mounted on said cover for connection to the gear shifting mechanism of the transmission, a multiple control valve mounted on said cover, means on said control valve for connection to a source of fluid pressure, means providing communication between said multiple control valve and said clutch cylinder and gear shifting cylinder for controlling the operation thereof in response to energization of said valve for supplying fluid under pressure to said cylinders in proper sequence for shifting gears.

3. A control system for a transmission comprising a clutch actuating cylinder and piston mounted on a wall of the transmission for connection to a clutch for effecting engagement and disengagement, a gear shifting cylinder mounted on the same wall of said transmission and a double-acting ram in said gear shifting cylinder for connection to a gear shifting element of the transmission, a valve cylinder mounted on said same wall of the transmission and a plunger having a plurality of lands and grooves movable in said valve cylinder, said clutch actuating cylinder, said gear shifting cylinder, and said valve being positioned in side-by-side relation on the said same wall of said transmission, means providing communication between said valve cylinder and opposed ends of said gear shifting cylinder and means providing communication between said value and said clutch cylinder whereby movement of said valve plunger will cause said piston and ram to operate in sequential relation for shifting gears in the transmission.

4. A unitary control system for a gear change transmission comprising a cover having integrally formed thereon a clutch operating cylinder, a gear shifting cylinder and a valve cylinder, a piston in said clutch cylinder normally biased in one direction and provided with means for connecting the same to a clutch, a double acting ram in said gear shifting cylinder with resilient means for maintaining said ram in an intermediate position, said ram being provided with means for connection to a gear shifting element for shifting gears of a transmission, a plunger having a plurality of lands and grooves mounted for axial sliding movement in said valve cylinder, said valve cylinder having means for connection to a source of fluid pressure and means for discharge of fluid, means providing communicating passages between said valve cylinder and said clutch cylinder, means providing communication between said valve cylinder and each end of said gear shift cylinder, said valve plunger and valve cylinder being so arranged that movement of the plunger provides communication between a source of fluid pressure and said clutch cylinder and said gear shifting cylinder whereby the gears of a transmission may be shifted by movement of said valve plunger.

5. A control device for a transmission comprising a first fluid pressure operated means mounted on the wall of a transmission for connection to a clutch, a second fluid pressure operated means mounted on the same wall of the transmission for connection to a gear shift element, a valve mounted on the said same wall and having a connection for a source of fluid pressure, said valve and said first and second fluid pressure operated means being positioned in side-by-side relation on the said same wall of said transmission, and means providing communication between said valve and said first and second fluid operated means for operating said means in sequential relation whereby gears of a transmission may be shifted by movement of the valve.

JOHN H. WEAVING.
ERIC R. PAYNE.

References Cited in the file of this patent
UNITED STATES PATENTS

| Number | Name | Date |
| --- | --- | --- |
| 1,010,054 | Irish | Nov. 28, 1911 |
| 1,529,369 | Nash | Mar. 10, 1925 |
| 1,544,909 | Josephs et al. | July 7, 1925 |
| 2,189,680 | Sanford | Feb. 6, 1940 |
| 2,212,803 | Wolff | Aug. 27, 1940 |
| 2,230,133 | Clarke | Jan. 28, 1941 |
| 2,388,088 | Sanford | Oct. 30, 1945 |
| 2,451,058 | Bennetch | Oct. 12, 1948 |
| 2,478,058 | Schantz | Aug. 2, 1949 |
| 2,511,373 | Price | June 13, 1950 |